United States Patent
Shibata

(10) Patent No.: US 9,694,326 B2
(45) Date of Patent: Jul. 4, 2017

(54) COMPOSITE HOLLOW FIBER MEMBRANE AND HOLLOW FIBER MEMBRANE MODULE

(71) Applicant: Mitsubishi Rayon Co. Ltd., Chiyoda-ku (JP)

(72) Inventor: Noritaka Shibata, Toyohashi (JP)

(73) Assignee: Mitsubishi Rayon Co., Ltd., Chiyoda-ku (JP)

( * ) Notice: Subject to any disclaimer, the term of this patent is extended or adjusted under 35 U.S.C. 154(b) by 217 days.

(21) Appl. No.: 14/388,616

(22) PCT Filed: Mar. 29, 2013

(86) PCT No.: PCT/JP2013/059594
§ 371 (c)(1),
(2) Date: Sep. 26, 2014

(87) PCT Pub. No.: WO2013/147186
PCT Pub. Date: Oct. 3, 2013

(65) Prior Publication Data
US 2015/0122129 A1    May 7, 2015

(30) Foreign Application Priority Data

Mar. 30, 2012  (JP) .................................. 2012-080259

(51) Int. Cl.
*B01D 53/22* (2006.01)
*B01D 71/06* (2006.01)
(Continued)

(52) U.S. Cl.
CPC ............. *B01D 71/06* (2013.01); *B01D 53/22* (2013.01); *B01D 53/228* (2013.01); *B01D 69/08* (2013.01);
(Continued)

(58) Field of Classification Search
CPC ...... B01D 71/06; B01D 53/22; B01D 53/228; B01D 69/08; B01D 69/10; B01D 69/12;
(Continued)

(56) References Cited

U.S. PATENT DOCUMENTS 3,581,900 A * 6/1971 Clark .................. B01D 63/063
210/321.87
5,409,515 A * 4/1995 Yamamoto .......... B01D 39/163
55/341.1

(Continued)

FOREIGN PATENT DOCUMENTS

JP     02-279158     11/1990
JP     07-116483      5/1995
(Continued)

OTHER PUBLICATIONS

Dow "Quick Reference Guide Infuse Olefin Block Copolymers" 2 pages May 29, 2015 <http://msdssearch.dow.com/PublishedLiteratureDOWCOM/dh_0935/0901b803809355da.pdf?filepath=elastomers/pdfs/noreg/788-09501.pdf&fromPage=GetDoc>.*

(Continued)

*Primary Examiner* — Anthony Shumate
(74) *Attorney, Agent, or Firm* — Oblon, McClelland, Maier & Neustadt, L.L.P.

(57) ABSTRACT

This composite hollow fiber membrane comprises a gas-permeable non-porous homogeneous layer which has a polyolefin resin (A) as the main component and a porous support layer which is made of a polyolefin resin (B) and which supports said non-porous homogeneous layer, and the composite hollow fiber membrane is characterized in that the polyolefin resin (A) of non-porous homogeneous layer is a block copolymer of ethylene units and at least one type of olefin unit selected from α-olefin units having a carbon number of 3-20. By this means, a gas-permeable composite (Continued)

hollow fiber membrane is provided which has good gas permeability, reduces the impact of condensate on the performance of a gas dissolving module, and has excellent elution properties.

10 Claims, 1 Drawing Sheet

(51) Int. Cl.
B01D 69/08 (2006.01)
B01D 69/12 (2006.01)
B01D 71/80 (2006.01)
B01D 69/10 (2006.01)
B01D 71/26 (2006.01)

(52) U.S. Cl.
CPC .............. B01D 69/10 (2013.01); B01D 69/12 (2013.01); B01D 71/80 (2013.01); B01D 71/26 (2013.01); B01D 2325/00 (2013.01); B01D 2325/04 (2013.01); B01D 2325/32 (2013.01)

(58) Field of Classification Search
CPC .... B01D 71/80; B01D 71/26; B01D 2325/00; B01D 2325/04; B01D 2325/32
See application file for complete search history.

(56) References Cited

U.S. PATENT DOCUMENTS

| | | | | |
|---|---|---|---|---|
| 6,036,030 | A * | 3/2000 | Stone | B01D 63/061 210/490 |
| 6,379,796 | B1 | 4/2002 | Uenishi et al. | |
| 2003/0098275 | A1* | 5/2003 | Mahendran | B01D 67/0011 210/490 |
| 2004/0118770 | A1* | 6/2004 | Sale | B01D 69/02 210/488 |
| 2008/0078675 | A1* | 4/2008 | Kawahara | B01D 53/22 204/295 |
| 2008/0234435 | A1 | 9/2008 | Chang et al. | |
| 2010/0255207 | A1* | 10/2010 | Neubauer | C03C 25/30 427/389.9 |
| 2012/0080378 | A1* | 4/2012 | Revanur | F04B 19/00 210/644 |
| 2013/0255498 | A1 | 10/2013 | Shibata | |
| 2014/0096825 | A1* | 4/2014 | Bonekamp | B32B 27/32 136/259 |
| 2014/0127492 | A1* | 5/2014 | Stokes | D01F 6/30 428/220 |
| 2014/0221956 | A1* | 8/2014 | Martynus | A61F 13/49406 604/385.28 |
| 2014/0360560 | A1* | 12/2014 | Taniguchi | H01L 31/0481 136/251 |

FOREIGN PATENT DOCUMENTS

| | | |
|---|---|---|
| JP | 11-047565 | 2/1999 |
| JP | 2000-271549 | 10/2000 |
| JP | 2007-529617 | 10/2007 |
| JP | 2008-272696 | 11/2008 |
| JP | 2008-289977 | 12/2008 |
| JP | 2010-155207 | 7/2010 |
| WO | 2012-043613 | 4/2012 |

OTHER PUBLICATIONS

Dow "Infuse 9107 Olefin Block Copolymer" 2 pages Sep. 14, 2011 <http://catalog.ides.com/docselectaspx?1=38903&E=119894&DOC=DOWTDS&DS=123&DK=STD&DC=en>.*
Dow "AFFINITY Polyolefin Plastomers and Polyolefin Elastomers " Jul. 2013, 4 pages <http://msdssearch.dow.com/PublishedLiteratureDOWCOM/dh_08e0/0901b803808e0517.pdf?filepath=elastomers/pdfs/noreg/258-12901.pdf&fromPage=GetDoc>.*
Dow "Dow Affinity EG 8100G" 2 pages Oct. 30, 2003 <http://catalog.ides.com/docselect.aspx?1=38903&E=71414&DOC=DOWTDS&DS=123&DK=STD&DC=en>.*
Dow "INFUSE Olefin Block Copolymers" 4 pages Jun. 2015 <http://msdssearch.dow.com/PublishedLiteratureDOWCOM/dh_0935/0901b80380935564.pdf?filepath=elastomers/pdfs/noreg/788-08201.pdf&fromPage=GetDoc>.*
Hwang "Fundamentals of membrane transport" Korean J. Chem. Eng., 28(1), 1-15 (2011).*
Machine translation JP 2008-272696, Shibata, Nov. 15, 1990, 8 pages.*
Machine translation JP 2008-289977 A, Shibata, Apr. 12, 2008, 16 pages.*
Perry "Perry's Chemical Engineers Handbook"1999, p. 22-38, McGraw-Hill.*
U.S. Appl. No. 14/386,981, filed Sep. 22, 2014, Shibata.
Extended European Search Report issued Mar. 20, 2015 in Patent Application No. 13767601.1 8 pages.
"ENGAGE™ Polyolefin Elastomers Product Selection Guide" DOW, http://msdssearch.dow.com/PublishedLiteratureDOWCOM/dh_0916/0901b8038091684e.pdf?filepath=elastomers/pdfs/noreg/774-00101.pdf&fromPage=GetDoc, XP055175051, 2014, 4 pages.
"AFFINITY™ Polyolefin Plastomers and Polyolefin Elastomers Product Selection Guide" DOW, http://msdssearch.dow.com/PublishedLiteratureDOWCOM/dh_08e0/0901 b803808e0517.pdf?filepath=elastomers/pdfs/noreg/258-12901.pdf&fromPage=GetDoc, XP055175050, 2013, 4 pages.
International Search Report issued Jun. 11, 2013, in PCT/JP13/059594, filed Mar. 29, 2013.

* cited by examiner

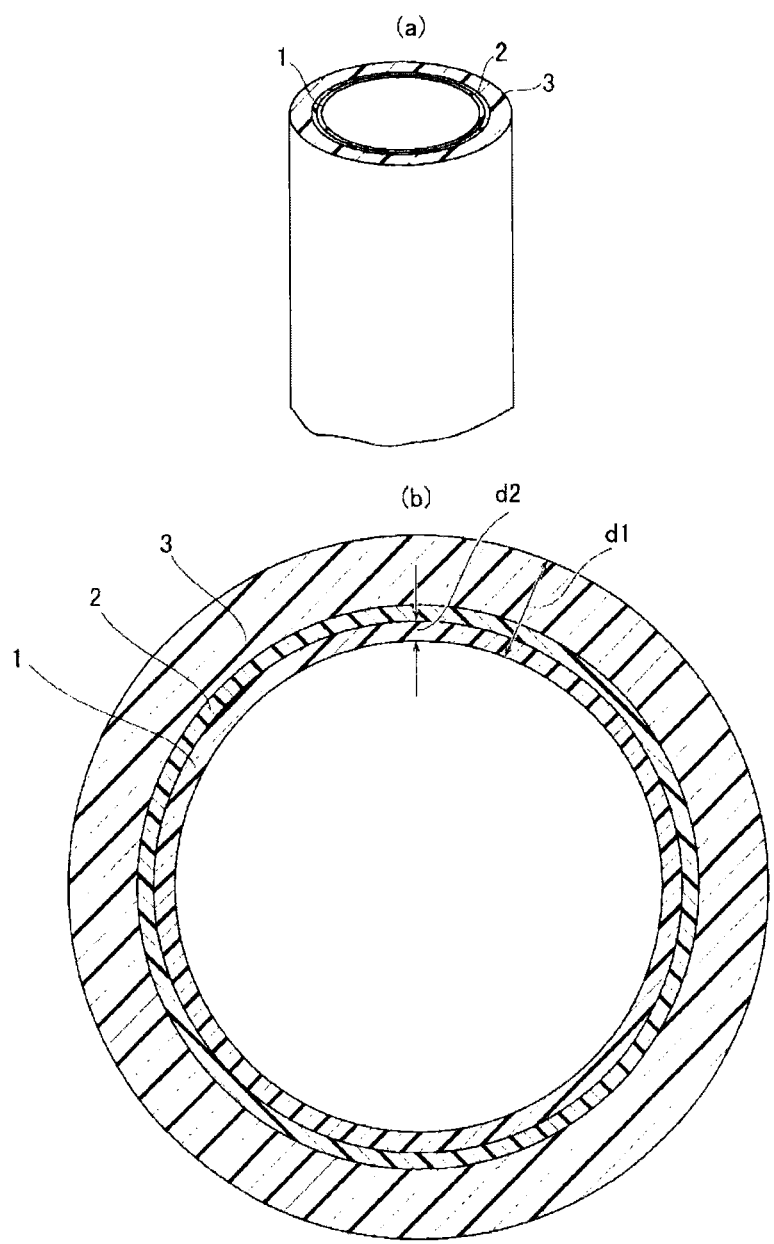

COMPOSITE HOLLOW FIBER MEMBRANE AND HOLLOW FIBER MEMBRANE MODULE

TECHNICAL FIELD

The present invention relates to a composite hollow fiber membrane, a production method thereof, and a hollow fiber membrane module equipped with the composite hollow fiber membrane.

BACKGROUND ART

In order to remove particulates, organic matter, metals, etc. from the surfaces of electronic materials such as silicon substrates for semiconductors, glass substrates for liquid crystals, quartz substrates for photomasks, etc., functional cleaning water prepared by dissolving a specific gas in ultrapure water by a gas dissolving device, and then adding trace amounts of chemicals as necessary has come to be used in place of high concentration chemical solutions. As the specific gas used in the functional cleaning water, in addition to carbon dioxide gas, hydrogen gas, oxygen gas, ozone gas, there are also inert gases, etc. such as noble gases. Above all, methods for dissolving carbon dioxide gas and hydrogen gas are being considered.

In particular, carbonated water is being used in order to rinse a cleaned object surface without electrically charging the cleaned object or nozzle. In other words, when using ultrapure water in cleaning, due to the magnitude of the insulation property thereof, the cleaned object may be charged due to the friction with the cleaner. If the cleaned object electrically charges, for example, such as in a case of there being a fine circuit pattern on the cleaned object, the circuit thereof may be damaged. Carbonated water with enhanced conductivity by dissolving carbon dioxide gas in ultrapure water is being used in order to prevent this.

The carbon dioxide gas concentration of this carbonated water is set to a low concentration at 1 to 100 mg/L, due to only being for imparting conductivity to ultrapure water. In order to efficiently dissolve the above-mentioned gases, a gas dissolving membrane module equipped with a gas-permeable membrane having a property of allowing only gas to permeate is being practically used (for example, Patent Document 1). When using the gas dissolving membrane module, gas dissolved water free of bubbles can be produced easily.

In addition, a method of using a porous hollow fiber membrane as the hollow fiber membrane has been proposed (Patent Document 2).

In the case of using a porous hollow fiber membrane in the gas dissolving membrane module, the membrane is hydrophilized from use over a long time period, and water will leak to the gas side and block the membrane surface, and thus there is concern over the initial carbon dioxide gas addition ability no longer being able to be obtained.

As a non-porous gas separation membrane, an ethylene-vinyl alcohol-based polymer composite membrane for a gas separation membrane consisting of an ethylene-vinyl alcohol-based polymer and an amine compound (Patent Document 3); a composite hollow fiber membrane having a three-layer structure in which a homogeneous layer consisting of a linear polyethylene is sandwiched by two porous layers (Patent Document 4); etc. have been presented.

In the case of using a non-porous hollow fiber membrane, since a non-porous membrane is present between the gas side and liquid side, water will not leak to the gas side even if using for a long time period; however, due to the water vapor permeability of the membrane, the water vapor having permeated condenses on the gas side from the change in water temperature, fluctuation in pressure, etc., and thus there has been concern over the condensed water (drain) blocking the membrane surface nonetheless.

If the condensed water is a small amount, the influence exerted on the performance of the gas dissolving module will be slight; however, when the amount of condensed water increases, it gradually accumulates upwards from the bottom of the gas chamber, the effective area of the gas permeable membrane contributing to the dissolution of gas decreasing, whereby the performance of the gas dissolving module declines, and the gas concentration contained in the functional cleaning water decreases.

The gas dissolving module feeds gas to be dissolved into the gas chamber, causing the gas component to migrate through a membrane to a water chamber, and the migration of water vapor in the opposite direction through the membrane is almost never taken into account, and thus countermeasures for condensed water have not been considered sufficiently.

Patent Document 1: Japanese Unexamined Patent Application, Publication No. 2000-271549
Patent Document 2: Japanese Unexamined Patent Application, Publication No. H02-279158
Patent Document 3: Japanese Unexamined Patent Application, Publication No. 2010-155207
Patent Document 4: Japanese Unexamined Patent Application, Publication No. H11-47565

DISCLOSURE OF THE INVENTION

Problems to be Solved by the Invention

The ethylene-vinyl alcohol-based polymer composite membrane for a gas separation membrane consisting of an ethylene-vinyl alcohol-based polymer and an amine compound of Patent Document 3 has a problem in that the moisture content is high at 100%, the water vapor permeability is remarkably high, and thus the periodic discharge of drain water is necessary.

The composite hollow fiber membrane of Patent Document 4 has a low oxygen permeability coefficient for the homogeneous layer; therefore, in order to obtain a permeability flow rate of dissolved gas that is useful upon practical use, it is necessary to establish the homogeneous layer as a very thin membrane at no more than 0.3 μm. However, since thinning of the homogeneous membrane is difficult, pinholes have developed from the mechanical strength of the membrane declining. Although the water vapor permeability is low due to the homogeneous layer membrane layer having PE, it has a problem in that the leaking of condensed water from pinholes cannot be avoided.

The object of the present invention is to solve the above-mentioned problems and provide a composite hollow fiber membrane for degassing which has good gas permeability, further reduces the impact of condensed water on the performance of a gas dissolving module, and has excellent elution properties.

Means for Solving the Problems

It was found that the object is achieved by establishing a homogeneous layer of a composite hollow fiber membrane as a non-porous homogeneous layer containing a polyolefin resin A that permeates gas, establishing a support layer that supports the homogeneous layer as a porous layer containing a polyolefin resin B, and using a block copolymer of ethylene units and at least one type of olefin unit selected from C3 to C20 α-olefin units as the polyolefin resin A of the homogeneous layer.

In other words, the present invention provides the following.

According to a first aspect of the present invention, a composite hollow fiber membrane includes: a non-porous homogeneous layer that is gas permeable having a polyolefin resin A as a main component; and a porous support layer having a polyolefin resin B as a main component that supports the non-porous homogenous layer, wherein the polyolefin resin A of the non-porous homogeneous layer is a block copolymer of ethylene units and at least one type of olefin units selected from C3 to C20 α-olefin units.

According to a second aspect of the present invention, in the composite hollow fiber membrane as described in the first aspect, the α-olefin units of the non-porous homogeneous layer are C6 to C20 α-olefin units.

According to a third aspect of the present invention, in the composite hollow fiber membrane as described in the second aspect, the α-olefin units of the non-porous homogeneous layer are 1-octene units.

According to a fourth aspect of the present invention, in the composite hollow fiber membrane as described in any one of the first to third aspects, oxygen permeability (JISK7126) at 25° C. of the polyolefin resin A of the non-porous homogeneous layer is at least $50\times10^{-16}$ mol·m/m$^2$·s·Pa.

According to a fifth aspect of the present invention, in the composite hollow fiber membrane as described in any one of the first to fourth aspects, moisture permeance at 25° C. of the polyolefin resin A of the non-porous homogeneous layer is no more than $3.00\times10^{-3}$ g/m·24 hr.

According to a sixth aspect of the present invention, in the composite hollow fiber membrane as described in any one of the first to fifth aspects, the porous support layer supporting the non-porous homogeneous layer is disposed on an outer-layer side of the non-porous homogeneous layer, and the non-porous homogeneous layer is disposed in a region within $1/10$ to $1/4$ of the membrane thickness from an inner most surface of the hollow fiber membrane in a membrane thickness direction.

According to a seventh aspect of the present invention, in the composite hollow fiber membrane as described in any one of the first to sixth aspects, the density of the polyolefin resin A of the non-porous homogeneous layer is 0.86 to 0.89 g/cm$^3$.

According to an eighth aspect of the present invention, in the composite hollow fiber membrane as described in any one of the first to seventh aspects, the polyolefin resin A of the non-porous homogeneous layer has a melting point of at least 100° C. to no higher than 135° C.

According to a ninth aspect of the present invention, in the composite hollow fiber membrane as described in any one of the first to eighth aspects, the MFRD of the polyolefin resin A of the non-porous homogeneous polyolefin resin A measured in conformance with code D of JIS K7210 is 0.1 to 1.0 g/10 min·190° C.

According to a tenth aspect of the present invention, in the composite hollow fiber membrane as described in any one of the first to ninth aspects, the polyolefin resin A is polyethylene.

According to an eleventh aspect of the present invention, a hollow fiber membrane module includes the gas-permeable composite hollow fiber membrane as described in any one of the first to tenth aspects.

Effects of the Invention

The present invention can provide a composite hollow fiber membrane excelling in gas permeability with low water vapor permeability that can suppress the generation of drain water, and is capable of raising the amount of dissolved gas at high efficiency, and a production method of this composite hollow fiber membrane, as well as a hollow fiber membrane module equipped with this composite hollow fiber membrane.

BRIEF DESCRIPTION OF THE DRAWINGS

FIG. 1(a) shows schematic views of composite hollow fiber membranes of Examples 1 and 2; and
(b) shows a schematic cross-sectional views of the composite hollow fiber membranes of Examples 1 and 2.

PREFERRED MODE FOR CARRYING OUT THE INVENTION (Composite Hollow Fiber Membrane)

A composite hollow fiber membrane of the present invention (hereinafter referred to also as "present composite hollow fiber membrane") is a composite hollow fiber membrane having a non-porous homogeneous layer through which gas permeates, and a porous layer supporting this homogeneous layer. Since the composite hollow fiber membrane of the present invention is used with the object of gas permeation, it is also called a gas-permeable composite hollow fiber membrane.

(Homogeneous Layer)

The homogeneous layer is a non-porous layer having gas permeability that contains a polyolefin resin A as a main component. The polyolefin resin A is a block copolymer of ethylene units and at least one olefin unit selected from C3 to C20 α-olefin units.

In the present specification, "permeates gas" or "gas-permeable" indicates a characteristic of only permeating gas without permeating liquids, etc., for example, a membrane through which water does not permeate, but water vapor permeates.

In the present specification, "non-porous" indicates a state of a solid in which there are substantially no holes having a pore size of micrometer order, and the inside is filled by resin.

In the olefin block copolymer forming the non-porous polyolefin homogeneous layer in the present invention, the α-olefin units are C3 to C20 olefin units, and preferably include C6 to C20 α-olefin units. It is more preferable for the α-olefin units to be octene units, and most preferably 1-octene units.

In the olefin block copolymer of the present invention, the ethylene unit content is preferably 25 to 97 mol %, more preferably 40 to 96 mol %, and even more preferably 55 to 95 mol %.

MFRD (melt flow rate) measured in compliance with code D of JIS K7210 for the polyolefin resin A of the present invention is preferably 0.1 to 1.0 g/10 min·190° C., and more preferably 0.3 to 1.0 g/10 min·190° C. This is because, so long as in this range, a composite hollow fiber membrane excelling the gas permeability and rigidity will be obtained.

As the structure of the polymer, it is desirably a multi-block structure that is an olefin block copolymer containing a crystalline polymer block with ethylene units as a main constituent (hard segment) and at least one type of α-olefin unit selected from C3 to C20 α-olefin units (soft segment), in which at least 2, preferably at least 3, of each block is connected alternately. In addition, although there are linear structures and radial structures, a linear structure is particularly preferable.

In addition, the block length can be changed by controlling the proportion and type of the catalyst, proportion and type of chain shattering agent (chain shattering agent), polymerization temperature, etc.

By employing this technique, it is possible to synthesize a novel olefin block copolymer (OBC) in a continuous method. The block copolymer synthesized by the technique of chain shattering reaction catalyst has very little comonomer content, and consists of crystalline ethylene/α-olefin blocks (hard) having high melting point, which replaces crystalline ethylene-octene blocks (soft) having large comonomer content. Therefore, the OBC is also called an ethylene/α-olefin block interpolymer.

In the present invention, by employing a block copolymer as the non-porous homogeneous layer, a composite hollow fiber membrane of low water vapor permeability while maintaining gas permeability can be obtained. According to such a hollow fiber membrane, the generation of drain water can be suppressed over a long period, and the dissolved gas amount in the cleaning liquid can be stably raised with high efficiency.

The density of the polyolefin resin A forming the non-porous homogeneous layer is preferably 0.860 to 0.890 g/cm$^3$. So long as the density of the polyolefin resin A is within this range, the gas permeability of the homogeneous layer will improve. Generally, the gas permeability becomes higher with smaller density.

For this reason, if the density is larger than 0.89 g/cm$^3$, it will not be possible to obtain sufficient gas permeability due to being less than $50 \times 10^{-16}$ mol·m/m$^2$·s·Pa oxygen permeability (JISK7126) at 25° C. In addition, when the density is smaller than 0.86 g/cm$^3$, although the gas permeability will be satisfied, the moisture permeance at 25° C. becomes higher than $3.00 \times 10^{-3}$ g/m·24 hr, and upon degassing and gas dissolution of water and a solution like that containing at least 50% water, condensed water will be produced from the temperature change, pressure change, etc. during operation and not only becomes drain water, but the condensed water having penetrated to the porous support layer will suppress the permeation of gas; therefore, the gas permeability itself will decline, and thus it is not preferable. The moisture permeance at 25° C. is preferably no more than $3.00 \times 10^{-3}$ g/m·24 hr, and more preferably no more than $1.0 \times 10^{-3}$ g/m·24 hr.

In addition, for the olefin block copolymer of the present invention, the melting point according to DSC is preferably 100 to 135° C., more preferably 100 to 130° C., and even more preferably 115 to 125° C. in the point of consistency of moldability with the support layer side.

Herein, melting point according to DSC is the peak tip melting point obtained from differential scanning calorimetry (DSC), and more specifically, is the value obtained using DSC by taking a sample amount of 10 mg, holding at 190° C. for 5 min, following by crystalizing at the temperature falling-rate of 10° C./min until −10° C., holding at −10° C. for 5 min, followed by measuring at 200° C. at a temperature rising-rate of 10° C./min.

The moisture permeance at 25° C. of the polyolefin resin A constituting the non-porous homogeneous layer is preferably no more than $1.00 \times 10^{-3}$ g/m·24 hr. Even when the homogeneous layer having this gas separation ability as the gas-permeable membrane is non-porous, if the moisture permeance is high, condensed water will tend to be produced due to water vapor permeating even without water leaking. For this reason, it is preferable for the moisture permeance to be low.

The ratio Mw/Mn of the weight average molecular weight and the number average molecular weight of the polyolefin resin A is preferably no more than 3.0, and more preferably 1.5 to 2.5. Generally, the viscosity influences the moldability of a resin. Furthermore, the viscosity has a great dependence on Mw. It is necessary to raise Mn in order to reduce the defects (leaks, etc.) in the homogeneous layer. In addition, it is preferable to decrease the ratio Mw/Mn (polydispersity) in order to increase the craze strength while maintaining moldability.

This is because, if the ratio Mw/Mn is within this range, the strength can be improved while maintaining moldability, and the present composite hollow fiber membrane excelling in gas permeability and without defects tends to be obtained.

As the polyolefin resin A used in the homogeneous layer of the present invention, for example, polyethylene can be exemplified. Herein, polyethylene of the present invention refers to the matter of segment consisting of ethylene units being more abundant than other polymer block segments.

Elastomer characteristic is considered to depend on the fringed micellar crystals acting as the junctions of the network. However, since fringed micellar crystals are low melting point, the heat resistance, i.e. usable temperature range, has been limited.

Therefore, in recent years, Dow Chemical Company has developed the technology of a chain shattering reaction catalyst. More specifically, it is possible to synthesize by following the method disclosed in Japanese Unexamined Patent Application (Translation of PCT Publication), Publication No. 2007-529617.

For example, it is possible to produce by preparing a composition containing a mixture or reaction product obtained by combining (A) a first olefin polymerization catalyst, (B) a second olefin polymerization catalyst that can prepare a polymer differing in chemical properties or physical properties from the polymer prepared by the catalyst (A) under the same polymerization conditions, and (C) a chain shattering agent, and then passing through a process of bringing the above-mentioned ethylene and α-olefin into contact with this composition under addition polymerization conditions. In polymerization, it is preferable to use a continuous solution polymerization method. In the continuous solution polymerization method, the catalyst component, chain shattering agent, monomers, and depending on the case, solvent, auxiliary agents, trapping agent and polymerization auxiliary agent, are supplied continuously to the reaction zone, and the polymer product is extracted continuously therefrom.

More specifically, as the olefin block copolymer that is the polyolefin resin A in the present invention, a commercially available one can also be used. For example, trade names INFUSE D9000, D9007, D9100, D9107, D9500, D9507, D9530, D9817, D9807, etc. are sold commercially by Dow Chemical Corp.

The non-porous homogeneous layer is preferably a layer with the polyolefin resin A as a main component. Layer with the polyolefin resin A as a main component is a layer in which the content of the polyolefin resin A is at least 90% by mass relative to the total mass of the homogeneous layer. The content of the polyolefin resin A in the layer with the polyolefin resin A as a main component is preferably at least 95% by mass, more preferably at least 99% by mass, and particularly preferably 100% by mass.

In addition, so long as within a range not harming the object of the present invention, additives such as antioxidants, ultraviolet light absorbers, lubricants, anti-blocking agents, pigments and flame retardants may be added to the homogeneous layer as necessary.

The thickness of the homogenous layer is preferably 0.5 to 10 µm. If the thickness of the homogenous layer is at least 0.5 µm, the pressure resistance will improve. If the thickness of the homogeneous layer is no more than 10 µm, the gas permeability will improve.

The thickness of the homogeneous layer, in the case of the present composite hollow fiber membrane having a plurality of homogenous layers, is the thickness of the respective homogeneous layers thereof.

(Porous Support Layer)

The porous support layer is a layer containing the polyolefin resin B as a main component, supporting the non-porous homogeneous layer. The polyolefin resin B is not particularly limited so long as being a material that has compatibility with the polymer constituting the non-porous homogeneous layer, and that can form a porous structure. More specifically, it is preferably high density polyethylene.

High density polyethylene generally has higher crystallinity with higher density, and the pore forming process by a drawing method is simple. For this reason, a preferable range of density is 0.960 to 0.968 g/cm$^3$.

High density polyethylene is most preferably ethylene homopolymer. In addition, it may be a copolymer with another olefin. The amount of olefin comonomer in this case is preferably 0 to 20 mol %, and in particular, more preferably no more than 5 mol %.

Being "porous" in the present specification refers to the matter of pores with an average diameter on the order of 0.01 to 1 µm having a porosity of at least 20% by volume.

The porosity of the porous support layer is preferably 30 to 80% by volume relative to 100% by volume of the overall porous support layer. If the porosity is at least 30% by volume, superior gas permeability tends to be obtained. If the porosity is no more than 80% by volume, the mechanical strength such as pressure resistance improves.

The size of the pores in the porous support layer is not particularly limited, and is adequate so long as a size at which sufficient gas permeability and mechanical strength are satisfied. For example, it is preferably an average diameter on the order of 0.05 to 0.1 µm.

A preferred range for the MFRD of the polyolefin resin B used in the porous support layer is 0.1 to 1.0 g/10 min. If the MFRD of the polyolefin resin B is at least 0.1 g/10 min, the melt viscosity will not be too large, and the molding range in which the orientation of crystals can be improved will broaden. In addition, adaption to a field in which a diameter reduction is required for raising the packing ratio of modules is facilitated. If the MFRD of the polyolefin resin B is no more than 1.0 g/10 min, the melt viscosity tends to be suppressed from becoming too small, the orientation of crystals is improved by raising the draft ratio and it becomes easy to form pores by drawing. In addition, the rigidity improves, and an improvement in gas permeability by membrane thinning and porosity raising becomes easy.

In addition, the polyolefin resin A (olefin block copolymer) and polyolefin resin B preferably agree in melt properties from the point of gas permeability and solvent resistance; therefore, a smaller difference between the MFRD of each is more preferable, and the difference is preferably no more than 0.5 g/10 min.

The porous layer is preferably a layer with the polyolefin resin B as a main component. Layer with the polyolefin resin B as a main component is a layer in which the content of the polyolefin resin B is at least 90% by mass. The content of the polyolefin resin B in the layer with the polyolefin resin B as a main component is preferably at least 95% by mass, more preferably at least 99% by mass, and particularly preferably 100% by mass.

In addition, so long as within a range not harming the object of the present invention, additives such as antioxidants, ultraviolet light absorbers, lubricants, anti-blocking agents, pigments and flame retardants may be added to the porous layer as necessary.

(Production Method of Gas-Permeable Composite Hollow Fiber Membrane)

The composite hollow fiber membrane of the present invention is formed from the aforementioned non-porous homogeneous layer and porous support layer. For example, it can be obtained by way of a multi-layer composite spinning process and drawing pore formation process.

As a form of the composite membrane constituting the hollow fiber membrane, it may be a two-layer composite membrane of the non-porous homogeneous layer (separation layer) having gas permeability and the porous support layer supporting the non-porous homogeneous layer, or may be a three-layer composite membrane in which the non-porous homogeneous layer having gas permeability is sandwiched by the porous support layers. It may further be a four or more layer composite membrane. It is particularly preferable to consist of a three or more layer composite membrane.

"Position" of the homogeneous layer having gas permeability in the three or more layer composite membrane is preferably arranged within a range of $\frac{1}{10}$ to $\frac{1}{4}$ from the inner side of the hollow fiber membrane, relative to the thickness (d1 in FIG. 1) of the hollow fiber membrane. "Position of the homogeneous layer" in the present specification indicates the distance from the innermost face of the hollow fiber until the end face of the non-porous homogeneous layer closest to this innermost face (d2 in FIG. 1). Upon manufacturing into a module, a potting resin impregnates from the outer circumferential direction of the membrane to produce an anchoring effect. Since the homogeneous layer is a non-porous structure, the potting resin will not impregnate inside therefrom, and thus it is possible to better prevent damage to the membrane from bending accompanying pressure fluctuations in the vicinity of the potting part as the region embedded by the potting resin increases. In addition, when setting the thickness of the support layer on the inner side of the homogeneous layer to no more than $\frac{1}{10}$ of the membrane thickness, it is not preferable because, in the drawing process for forming pores in the support layer polymer, defects arise by the homogeneous layer polymer being dragged to the support layer polymer of the inner layer on which it is adhering. In addition, when setting the thickness of the support layer on the inner side of the homogeneous layer to at least $\frac{1}{4}$, it is not preferable because the embedded region of the potting resin becomes small and receives the influence of bending and the like and is damaged.

The positional relationships of the non-porous homogeneous layer and porous support layers of the composite hollow fiber membrane in the Examples of the present invention are shown in FIG. 1 as schematic views. Each drawing is a schematic perspective view, and does not faithfully express the thicknesses and positions of the actual membrane (layers).

Although the width of the present composite hollow fiber membrane is not particularly limited, the hollow fiber membrane outside diameter is preferably 100 to 2000 μm. If the hollow fiber membrane outside diameter is at least 100 μm, the gap between hollow fiber membranes during production of a hollow fiber membrane module will tend to be sufficiently acquired, whereby the potting resin will come to easily impregnate between hollow fiber membranes. If the hollow fiber membrane outside diameter is no more than 2000 μm, it will be possible to decrease the size of the module overall also when producing a hollow fiber membrane module using several hollow fiber membranes. Since the volume of the potting processed part also decreases thereby, a decline in the dimensional precision due to shrinking of the resin for potting during the potting process tends to be suppressed.

The membrane thickness (d1) of the hollow fiber membrane is preferably 10 to 200 μm. If the thickness is at least 10 μm, the mechanical strength will improve. Furthermore, if the thickness is no more than 200 μm, it tends to suppress the fiber outside diameter of the present composite hollow fiber membrane from becoming too thick and the volumetric efficiency of the membrane upon building into a membrane module reducing.

The present composite hollow fiber membrane can be produced by way of a method including, for example, the below-mentioned 1) spinning process and 2) drawing process.

1) Spinning process: For example, if the present composite hollow fiber membrane of a three-layer structure, a composite nozzle spinneret is used in which the outermost layer nozzle part, intermediate layer nozzle part and innermost layer nozzle part are arranged concentrically. The polyolefin resin B is supplied in the molten state to the outermost layer nozzle part and innermost layer nozzle part, and the polyolefin resin A is supplied in the molten state to the intermediate layer nozzle part. Then, the polyolefin resin A and polyolefin resin B are extruded from each of these nozzle parts, and cooled to solidify in an undrawn state while appropriately adjusting the extrusion speed and winding speed. A hollow fiber membrane precursor is obtained having a three-layer structure in which the undrawn homogeneous layer precursor is sandwiched by two undrawn porous layer precursors, which are in non-porous form.

The discharge temperature of the polyolefin resin A and polyolefin resin B is adequate so long as being a state in which these can sufficient melt and be spun.

2) Drawing process: The undrawn hollow fiber membrane precursor obtained by melt spinning is preferably fixed-length heat treated (annealed) prior to drawing at the melting point or lower.

Fixed-length heat treatment is preferably performed at 105 to 120° C. for 8 to 16 hours. If the temperature is at least 105° C., the present hollow fiber membrane of favorable quality tends to be obtained. If the temperature is no higher than 120° C., sufficient elasticity tends to be obtained, the stability during drawing improves, and drawing at a high scaling factor becomes easy. In addition, if the treatment time is at least 8 hours, the present hollow fiber membrane of favorable quality tends to be obtained.

The hollow fiber membrane precursor is drawn at conditions satisfying the below requirements of (i) and (ii).

(i) The relationship between the drawing temperature T (° C.) and melting point Tm (° C.) of the polyolefin resin A is $Tm-20 \leq T \leq Tm+40$.

(ii) The drawing temperature T is no higher than the Vicat softening point of the polyolefin resin B.

If the drawing temperature T is at least Tm−20 (° C.), pore forming in the porous layer precursor becomes easy, and the present composite hollow fiber membrane having superior gas permeability tends to be obtained. If the drawing temperature T is no higher than Tm+40 (° C.), defects such as pinholes by disorder arising in molecules tends to be suppressed from occurring.

In addition, if the drawing temperature T is no higher than the Vicat softening point of the polyolefin resin B, pore forming in the porous layer precursor becomes easy, and the present composite hollow fiber membrane having superior gas permeability tends to be obtained.

The drawing process preferably performs cold drawing prior to drawing performed at the drawing temperature T (hot drawing). In other words, a two-stage drawing that performs hot drawing in succession to cold drawing, or a multi-stage drawing that, in succession to cold drawing, performs hot drawing by dividing into multiple-stages of at least two stages is preferable.

Cold drawing is drawing that causes a structural collapse of the membrane at a comparatively low temperature, thereby causing micro cracking to occur. For the temperature of cold drawing, it is preferably carried out at a comparatively low temperature within a range from 0° C. to a temperature lower than Tm−20° C.

In drawing, low-speed drawing is preferable. If low-speed drawing, pore forming while suppressing the fiber diameter from becoming too fine during drawing becomes easy.

The draw ratio differs depending on the types of polyolefin resin A and polyolefin resin B used; however, the final ratio (total draw ratio) relative to the undrawn hollow fiber membrane precursor is preferably set to 200 to 500%. If the total draw ratio is at least 2 times, the porosity of the porous layer will improve, and superior gas permeability will tend to be obtained. If the total draw ratio is no more than 5 times, the rupture elongation of the present composite hollow fiber membrane will improve.

Furthermore, due to improving the dimensional stability of the hollow fiber membrane obtained from the drawing, it is preferable to perform heat setting under defined length conditions or in a state in which the porous hollow fiber membrane is slightly relaxed within a range of no more than 60%.

In order to effectively perform heat setting, the heat setting temperature is preferably at least the drawing temperature and no higher than the melting point temperature.

The present composite hollow fiber membrane explained in the foregoing has a non-porous homogeneous layer containing the polyolefin resin A as a main component and the porous layer containing the polyolefin resin B as a main component; therefore, it possesses both superior solvent resistance and gas permeability. In addition, it also has superior low elution properties.

(Hollow Fiber Membrane Module)

The hollow fiber membrane module of the present invention is a module equipped with the aforementioned present composite hollow fiber membrane. The hollow fiber membrane module of the present invention employs the same form as a conventional hollow fiber membrane module, except for using the present composite hollow fiber membrane. For example, a hollow fiber membrane module of a conventional form that is prepared by bundling several hundred of the present composite hollow fiber membranes and inserting into a cylindrical housing, then sealing these present composite hollow fiber membranes with a sealing material (potting resin) can be exemplified.

In addition, the packing ratio of hollow fiber membranes relative to the potting processed part volume is preferably on the order of 20 to 60%.

As a degassing method using a degassing membrane of the present invention, a raw solution containing dissolved gas is supplied to the inner side (primary side) of the hollow fiber membrane, the outer side (secondary side) of the hollow fiber membrane is made reduced pressure to cause the dissolved gas to permeate the membrane by way of the driving force proportional to the partial pressure difference of the dissolved gas, whereby the dissolved gas can be exhausted to the outer side of the hollow fiber membrane. In addition, the outer side of the hollow fiber membrane can conversely be defined as the primary side, and the inner side of the hollow fiber membrane defined as the secondary side. Furthermore, it is possible to degas a target chemical solution to a predetermined degassed level by connecting a plurality of the hollow fiber membrane modules in series, and degassing of a large amount of a chemical solution can be performed by connecting a plurality thereof in parallel.

EXAMPLES

Hereinafter, the present invention will be explained in detail by showing Examples and Comparative Examples. However, the present invention is not to be limited by the following description.
(Measurement of Tm)

The melting peak temperature and melting completion temperature were evaluated using a DSC (manufactured by Seiko Instruments Inc.), when melting about 5 mg of sample for 5 minutes at 200° C., then cooling at a rate of 10° C./min to 40° C. to crystallize, followed by further heating at 10° C./min to 200° C.
(Melt Flow Rate (MFR))

For the MFR of the polyethylene, MFR (units: g/10 min) was measured in conformance with code D of JIS K7210 (measurement temperature: 190° C., load: 2.16 kg).
(Density)

The density (units: kg/m$^3$) of polyethylene was measured in conformance with JIS K7112.
(Measurement of Molecular Weight Distribution (Mw/Mn))

The ratio Mw/Mn of the polyethylene was calculated by obtaining Mw and Mn from the calibration curves acquired by measurement by way of GPC (high-temperature GPC) at the below mentioned conditions, respectively. The calibration curves were third-order calculated by measuring reference samples of polystyrene, and using a polyethylene conversation factor (0.48). The column used the below three columns connected in series in order.
Measurement Conditions:

Measurement device: "150-GPC" (manufactured by Waters)

Columns: one "Shodex GPCAT-807/S" (manufactured by Showa Denko K.K.), two "Tosoh TSK-GEL GMH6-HT" (manufactured by Tosoh)

Solvent: 1,2,4-trichlorobenzene

Column temperature: 140° C.

Sample concentration: 0.05% by mass (injection amount: 500 µL)

Flow rate: 1.0 mL/min

Sample dissolution temperature: 160° C.

Sample dissolution time: 2.5 hours

In addition, for the polyethylene used in the formation of the porous layer, in the case of a shoulder peak being observed in the chart of the molecular weight distribution measured by the high-temperature GPC, the Mw and Mn of each component such as low-molecular weight components and high-molecular weight components, as well as the blending amounts of these components were calculated, approximating by a Gaussian distribution.
(Porosity)

The porosity of the obtained gas-permeable composite hollow fiber membrane (units: volume %) was measured using a mercury porosimeter Model 221 (manufactured by Carlo Erba Co.).
(Gas Permeability)

A hollow fiber membrane module was prepared by bundling the obtained gas-permeable composite hollow fiber membranes into a U-shape and fixing the ends of hollow fiber membranes with urethane resin. Oxygen or nitrogen was supplied from the outer side of the composite hollow fiber membrane, and the oxygen permeation rate (QO2) (units: m/hr·MPa) and nitrogen permeation rate (QN2) (units: m/hr·MPa) at 25° C. were measured with the inner side of the hollow fiber membranes (hollow fiber portion side) at normal pressure. It should be noted that the membrane surface area was calculated based on the inside diameter of the hollow fiber membrane. Then, the separation factor (QO2/QN2) was obtained from the measured oxygen permeation rate (QO2) and nitrogen permeation rate (QN2).
(Water-Vapor Permeability)
(1) Water-vapor permeability: Using a film sample of 450 µm thickness, it was measured by the cup method (JIS 20208 conformance, measurement environment: 25° C.×90% RH).
(2) Moisture permeance: It was measured according to the water-vapor permeability×membrane thickness, with the above-mentioned water-vapor permeability.

Example 1

A block copolymer of the ethylene and α-olefin produced with the chain shattering reaction catalyst (more specifically, ethylene-octene block copolymer in which α-olefin is 1-octene: trade name "INFUSE 9100", manufactured by Dow Chemical Corp., MFRD: 1.0 g/10 min, density: 0.877 g/cm$^3$, melting point Tm: 121° C., Mw/Mn=2.0) was used as the polyolefin resin A (for non-porous homogeneous layer formation). The moisture permeance at 25° C. was 0.48× 10$^{-3}$ g/m·24 hr, and further, the oxygen permeability coefficient at 25° C. (JISK7126) was 60.7×10$^{-16}$ mol·m/m$^2$·s·Pa.

High density polyethylene (trade name "Suntec B161", manufactured by Asahi Kasei Chemicals Corp., density: 0.963 g/cm$^3$, MFRD: 1.35 g/10 min) was used as the polyolefin resin B (for porous support layer formation).
Spinning Process:

A composite nozzle spinneret was used in which the outermost layer nozzle part, intermediate layer nozzle part and innermost layer nozzle part are concentrically arranged. An undrawn hollow fiber membrane precursor was obtained by supplying the polyolefin resin B in a molten state to the outermost layer nozzle part and innermost layer nozzle part, supplying the polyolefin resin A in a molten state to the intermediate layer nozzle part, ejecting so as to make polyolefin resin A from the outermost layer/polyolefin resin B/polyolefin resin A in the ratio of 12/1/2, and spinning these polyolefins at a winding rate of 135 m/min. In this hollow fiber membrane precursor, three layers in which a homogeneous layer precursor is sandwiched by two porous layer precursors are arranged concentrically.

Drawing Process:

The hollow fiber membrane precursor was annealed for 8 hours at 108° C. Next, by drawing 1.6 times at 23+/−2° C., and successively performing hot drawing until the total drawing rate became 580% in a heating oven at 105° C., pores were formed in the two porous layer precursors. Subsequently, a gas-permeable composite hollow fiber membrane was obtained by providing a relaxation process of 45% in a heating oven at 115° C., and molding so that the final total draw ratio (ratio relative to undrawn hollow-fiber membrane precursor) became 400%.

The prepared composite hollow fiber membrane had an inside diameter of 165 µm, outside diameter of 262 µm and membrane thickness of 48.3 µm, and the non-porous homogeneous layer was at a position about ⅛ of the membrane thickness from the inner side.

This gas-permeable composite hollow fiber membrane was a three-layer structure in which the homogeneous layer was sandwiched by two porous layers. In addition, the porosity of this gas-permeable composite hollow fiber membrane was 67.2% by volume.

Upon measuring the air permeation rate of the composite hollow fiber membrane, the oxygen permeation rate ($Q_{O2}$) at room temperature (25° C.) was 0.244 m/hr·Mpa, the nitrogen permeation rate ($Q_{N2}$) was 0.074 m/hr·Mpa, and the separation factor ($Q_{O2}/Q_{N2}$) was 3.3. Leaks did not occur even when dipping in isopropyl alcohol (IPA) since the separation factor of 3.3 of the polymer used in the thin film layer was preserved.

Furthermore, a hollow fiber membrane module was prepared using the prepared gas-permeable composite hollow fiber membrane. Despite operating for one month by configuring so as to flow water at 50° C. on the inner side of the hollow fiber membrane and blow carbon dioxide from the outer side of the hollow fiber membrane to produce carbonated water, condensed water was not produced on the gas phase side due to the lowness of the water vapor permeability of the membrane.

Example 2

A block copolymer of the ethylene and α-olefin produced by the chain shattering reaction catalyst (more specifically, ethylene-octene block copolymer in which α-olefin is 1-octene: trade name "INFUSE 9107", manufactured by Dow Chemical Corp., MFRD: 1.0 g/10 min, density: 0.866 g/cm$^3$, melting point Tm: 120° C., Mw/Mn=2.0) was used as the polyolefin resin A (for non-porous homogeneous layer formation). The moisture permeance at 25° C. was 0.76× 10$^{-3}$ g/m·24 hr, and the oxygen permeability coefficient at 25° C. (JISK7126) was 85.1×10$^{-16}$ mol·m/m$^2$·s·Pa.

The polyolefin resin B (for porous support layer formation) was the same as Example 1, and carried out similarly to Example 1 as for the discharge ratio.

Spinning was implemented at a discharge temperature of 180° C. and winding speed of 135 m/min. The obtained undrawn hollow fiber was 160 µm in inside diameter, and three layers were arranged concentrically. The undrawn hollow fiber was annealed for 8 hours at 108° C. By further drawing the annealed fiber 1.6 times at 23+/−2° C., and successively performing hot drawing until the total drawing rate became 5.8 times in a heating oven at 105° C., pores were formed in two porous layer support layer precursors. Subsequently, a gas-permeable composite hollow fiber membrane was obtained by providing a relaxation process of 0.69 times in a heating oven at 115° C., and molding so that the final total draw ratio (ratio relative to undrawn hollow-fiber membrane precursor) became 4 times. The prepared multi-layer composite hollow fiber membrane had an inside diameter of 156 µm, outside diameter of 251 µm and membrane thickness of 47.6 µm, and the non-porous homogeneous layer was at a position about ⅛ of the membrane thickness from the inner side.

This multi-layer composite hollow fiber membrane obtained in this way was a three-layer structure in which the non-porous homogeneous layer was sandwiched by two porous support layers. In addition, the porosity of this gas-permeable composite hollow fiber membrane was 66.6% by volume.

Upon measuring the air permeation rate of the composite hollow fiber membrane, the oxygen permeation rate ($Q_{O2}$) at room temperature (25° C.) was 0.400 m/hr·Mpa, the nitrogen permeation rate ($Q_{N2}$) was 0.142 m/hr·Mpa, and the separation factor ($Q_{O2}/Q_{N2}$) was 2.8. Leaks did not occur even when dipping in solvent (IPA) since the separation factor of 2.8 of the polymer used in the thin film layer was preserved.

Furthermore, a hollow fiber membrane module was prepared using the prepared gas-permeable composite hollow fiber membranes. Despite operating for one month by configuring so as to flow water at 50° C. on the inner side of the hollow fiber membrane and blow carbon dioxide from the outer side of the hollow fiber membrane to produce carbonated water, condensed water was not produced on the gas phase side due to the lowness of the water vapor permeability of the membrane.

Comparative Example 1

A random copolymer of the ethylene and α-olefin produced with a metallocene catalyst (more specifically, ethylene-octene random copolymer in which α-olefin is 1-octene: trade name "AFFINITY EG8100G", manufactured by Dow Chemical Corp., MFRD: 1.0 g/10 min, density: 0.870 g/cm$^3$, melting point Tm: 55° C., Mw/Mn=2.0) was used as the polyolefin resin A (for non-porous homogeneous layer formation). The moisture permeance at 25° C. was 4.5×10$^{-3}$ g/m·24 hr, and further, the oxygen permeability coefficient at 25° C. (JISK7126) was 69×10$^{-16}$ mol·m/m$^2$·s·Pa.

The polyolefin resin B (for porous support layer formation) was the same as Example 1, and carried out similarly to Example 1 as for the discharge ratio.

Spinning was implemented at a discharge temperature of 180° C. and winding speed of 130 m/min. The obtained undrawn hollow fiber was 180 µm in inside diameter, and three layers were arranged concentrically. The undrawn hollow fiber was annealed for 8 hours at 108° C. By further drawing the annealed fiber 120% at 23+/−2° C., and successively performing hot drawing until the total drawing rate became 400% in a heating oven at 70° C., a composite hollow fiber membrane was obtained. The prepared multi-layer composite hollow fiber membrane had an inside diameter of 160 µm, outside diameter of 256 µm and membrane thickness of 48 µm, and the non-porous homogeneous layer was at a position about ⅛ of the membrane thickness from the inner side.

This multi-layer composite hollow fiber membrane obtained in this way was a three-layer structure in which the non-porous layer was sandwiched by two porous layers. In addition, the porosity of this gas-permeable composite hollow fiber membrane was 63.0% by volume.

Upon measuring the air permeation rate of the composite hollow fiber membrane, the oxygen permeation rate ($Q_{O2}$) at room temperature (25° C.) was 0.36 m/hr·Mpa, the nitrogen permeation rate ($Q_{N2}$) was 0.13 m/hr·Mpa, and the separation factor ($Q_{O2}/Q_{N2}$) was 2.8. Leaks did not occur even when dipping in solvent (IPA) since the separation factor of 2.8 of the polymer used in the thin film layer was preserved.

Furthermore, a hollow fiber membrane module was prepared using the prepared gas-permeable composite hollow fiber membranes. It was operated by configuring so as to flow water at 50° C. on the inner side of the hollow fiber membrane and blow carbon dioxide from the outer side of the hollow fiber membrane to produce carbonated water. Despite being able to operate initially without producing condensed water, the strength declined due to the homogeneous layer being soft and leaks occurred on the fourth day.

Comparative Example 2

A thermoplastic polyurethane (Pandex T8375N manufactured by DIC Bayer Polymer) was used for homogeneous layer formation. The moisture permeance at 25° C. according to the JISZ0208 cup method of Pandex T8375N was 25.9 g/m·24 hr, and further, the oxygen permeability coefficient at 25° C. (JISK7126) was $19.0 \times 10^{-16}$ mol·m/m²·s·Pa.

The polyolefin resin B (for porous layer formation) was made the same Example 1, and was carried out similarly to Example 1 even for the discharge ratio ejecting so as to make polyolefin resin A from the outermost layer/polyolefin resin B/polyolefin resin A in the ratio of 12/1/2.

Spinning was implemented at a discharge temperature of 180° C. and winding speed of 90 m/min. The obtained undrawn hollow fiber was 200 μm in inside diameter, and three layers were arranged concentrically. The undrawn hollow fiber was annealed for 8 hours at 108° C. By further drawing the annealed fiber 160% at 23+/−2° C., and successively performing hot drawing until the total drawing rate became 300% in a heating oven at 110° C., a composite hollow fiber membrane was obtained. The prepared multi-layer composite hollow fiber membrane had an inside diameter of 200 μm, outside diameter of 280 μm and membrane thickness of 25 μm, and the non-porous homogeneous layer was at a position about ⅛ of the membrane thickness from the inner side.

This multi-layer composite hollow fiber membrane obtained in this way was a three-layer structure in which the non-porous layer was sandwiched by two porous layers. In addition, the porosity of this composite hollow fiber membrane was 43.0% by volume.

Upon measuring the air permeation rate of the composite hollow fiber membrane, the oxygen permeation rate ($Q_{O2}$) at room temperature (25° C.) was 0.28 m/hr·Mpa, the nitrogen permeation rate ($Q_{N2}$) was 0.10 m/hr·Mpa, and the separation factor ($Q_{O2}/Q_{N2}$) was 2.8. The separation factor of 2.8 of the polymer used in the thin film layer was preserved. Furthermore, a hollow fiber membrane module was prepared using the prepared gas-permeable composite hollow fiber membranes. It was operated by configuring so as to flow water at 50° C. on the inner side of the hollow fiber membrane and blow carbon dioxide from the outer side of the hollow fiber membrane to produce carbonated water. The penetration of water believed to be condensed water was confirmed after 24 hr.

INDUSTRIAL APPLICABILITY

The gas-permeable composite hollow fiber membrane of the present invention is very useful in the production of functional water used in the cleaning liquid of semiconductors, carbon dioxide dissolution for carbonated spring, the separation of methane gas from biogas, etc.

EXPLANATION OF REFERENCE NUMERALS

1: porous support layer (inner layer)
2: non-porous homogeneous layer
3: porous support layer (outer layer)
d1: hollow fiber membrane thickness
d2: distance from hollow fiber membrane innermost face to non-porous homogeneous layer

The invention claimed is:

1. A composite hollow fiber membrane comprising: a non-porous homogeneous layer that is gas permeable comprising a polyolefin resin A in an amount of at least 90% by mass; and a porous support layer comprising a polyolefin resin B in an amount of at least 90% by mass that supports the non-porous homogenous layer, wherein the polyolefin resin A of the non-porous homogeneous layer is a block copolymer of ethylene units and at least one type of olefin units selected from C3 to C20 α-olefin units,
    wherein the polyolefin resin A of the non-porous homogeneous layer has a melting point of at least 100° C. to no higher than 135° C.

2. The composite hollow fiber membrane according to claim 1, wherein the α-olefin units of the non-porous homogeneous layer are C6 to C20 α-olefin units.

3. The composite hollow fiber membrane according to claim 2, wherein the α-olefin units of the non-porous homogeneous layer are 1-octene units.

4. The composite hollow fiber membrane according to claim 1, wherein oxygen permeability (JISK7126) at 25° C. of the polyolefin resin A of the non-porous homogeneous layer is at least $50 \times 10^{-16}$ mol·m/m²·s·Pa.

5. The composite hollow fiber membrane according to claim 1, wherein moisture permeance at 25° C. of the polyolefin resin A of the non-porous homogeneous layer is no more than $3.00 \times 10^{-3}$ g/m·24 hr.

6. The composite hollow fiber membrane according to claim 1, wherein the porous support layer supporting the non-porous homogeneous layer is disposed on an outer-layer side of the non-porous homogeneous layer, and the non-porous homogeneous layer is disposed in a region within 1/10 to ¼ of the membrane thickness from an inner most surface of the hollow fiber membrane in a membrane thickness direction.

7. The composite hollow fiber membrane according to claim 1, wherein the density of the polyolefin resin A of the non-porous homogeneous layer is 0.86 to 0.89 g/cm³.

8. The composite hollow fiber membrane according to claim 1, wherein the MFRD of the polyolefin resin A of the non-porous homogeneous polyolefin resin A measured in conformance with code D of JIS K7210 is 0.1 to 1.0 g/10 min·190° C.

9. The composite hollow fiber membrane according to claim 1, wherein the ethylene unit content of said olefin block copolymer of said polyolefin resin A is 25 to 97 mol %.

10. A hollow fiber membrane module comprising the gas-permeable composite hollow fiber membrane according to claim 1.

* * * * *